United States Patent [19]
Schatz

[11] 3,836,267
[45] Sept. 17, 1974

[54] FITTING FOR RELEASABLY CONNECTING TWO PARTS, ESPECIALLY FURNITURE PARTS

[76] Inventor: Gerold Schatz, Ostdeutsche Str. 45, 732 Plochingen, Germany

[22] Filed: Apr. 23, 1973

[21] Appl. No.: 353,626

[30] Foreign Application Priority Data
Apr. 27, 1972   Germany............................ 2220675

[52] U.S. Cl.................. 403/17, 52/753 F, 403/18, 403/118, 403/231, 403/296
[51] Int. Cl........................................... F16b 12/10
[58] Field of Search ....... 403/17, 18, 118, 187, 189, 403/231, 263, 296, 306, 342, 343, 361; 52/753 E, 753 F, 755, 756

[56] References Cited
UNITED STATES PATENTS

| 3,102,746 | 9/1963 | Kerr | 52/753 F |
| 3,129,472 | 4/1964 | Hensel | 403/231 X |

FOREIGN PATENTS OR APPLICATIONS

| 1,300,357 | 7/1969 | Germany | 52/756 |
| 476,807 | 12/1937 | Great Britain | 403/17 |
| 521,114 | 3/1942 | Netherlands | 52/753 F |
| 301,391 | 11/1954 | Switzerland | 52/753 F |
| 311,753 | 2/1956 | Switzerland | 52/755 |

*Primary Examiner*—Werner H. Schroeder
*Attorney, Agent, or Firm*—Michael S. Striker

[57]   ABSTRACT

A fitting for releasably connecting two parts, especially furniture parts, with each other in which a socket provided with an inner screw thread is fixed in a bore of one part and in which a shaft is turnably but axially immovably mounted in a shell fixed in a bore in the other part axially aligned with the bore in the one part. The shaft has a portion projecting axially beyond the shell and provided with an outer screw thread for threading engagement with an inner screw thread of the socket. An actuating member in form of a lever is fixed to the shaft and projects radially therefrom adjacent the open end of the shell for turning the shaft and the threaded portion projecting therefrom for threadingly engaging the thread on the projecting portion with that of the socket.

24 Claims, 13 Drawing Figures

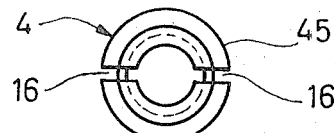
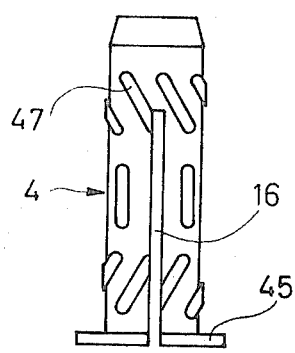
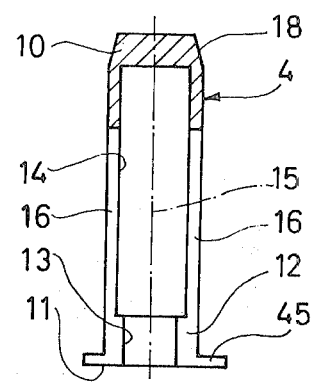
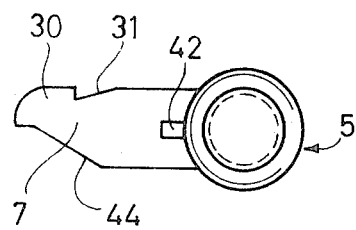
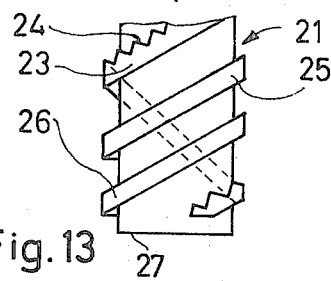
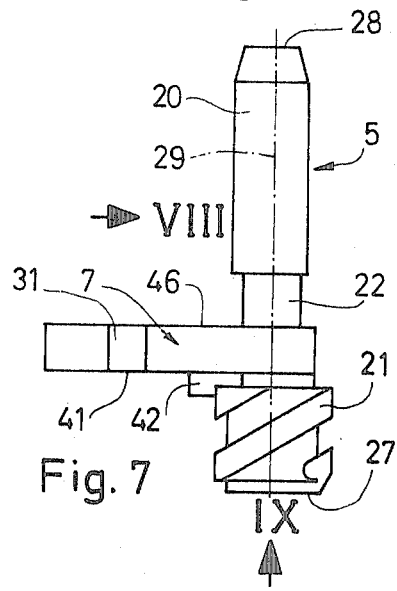
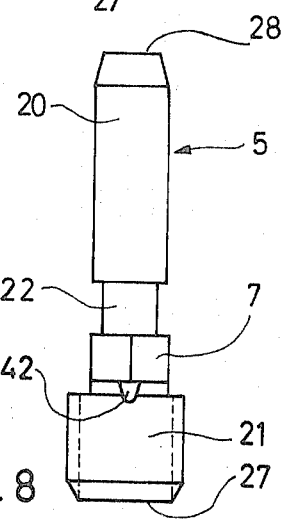

FITTING FOR RELEASABLY CONNECTING TWO PARTS, ESPECIALLY FURNITURE PARTS

BACKGROUND OF THE INVENTION

The present invention relates to a fitting for releasably connecting two parts, especially furniture parts, with a socket in a bore of one part and with a threadable member turnably but axially immovably assembled with the other part and which is connectable by means of an actuating member with the socket. In a known fitting of this type there is provided a socket which is located in a bore of one of the furniture parts, whereas the other furniture part is provided with a bore and at the end of the bore with a turnable locking member. The threadable part and a cover thereof are formed by separate elements which during connecting of the two furniture parts must be carefully assembled by the artisan during the assembly. During such an assembly the threaded part is first threadingly connected with the inner threads provided in the socket and then a shaft portion of the turnable part is inserted into the bore of the other furniture part, and the locking member in this other furniture part is turned whereby flanges of the locking member will engage in corresponding cutouts on the shaft portion so that the two furniture parts are thus connected to each other. Finally, the locking member is covered by a cap of plastic material. The various parts of the fitting are relatively expensive to manufacture and their assembly with the furniture part is connected with certain difficulties, especially if such assembly is carried out by an unskilled worker, and in addition one or the other of the many loose parts of the fitting may get lost during the shipping or assembly thereof.

SUMMARY OF THE INVENTION

It is an object of the present invention to provide for a fitting for releasably connecting two parts, especially furniture parts, which avoids the disadvantages of such fitting known in the art.

It is an additional object of the present invention to provide for such a fitting in which some of the components are preassembled so that loss of any loose components during shipping or the like may be substantially prevented.

It is further object of the present invention to provide for such fitting in which the individual components may be manufactured at reasonable cost and in which the final assembly of the components is simplified so that the final assembly of the components with the furniture parts may be carried out also by a layman without any difficulties.

It is also an object of the present invention to provide for a fitting of the aforementioned kind in which the fitting when assembled with the furniture parts is covered by the latter so that an additional cover member is unnecessary.

With these and other objects in view, which will become apparent as the description proceeds, the fitting according to the present invention for releasably connecting two parts, especially furniture parts, to each other mainly comprises a socket fixed in a bore of one of the parts, a shell axially aligned and facing with one end thereof a corresponding end of the socket and fixed in a bore of the other part, a member turnably but axially immovably mounted in the shell and having an axial projecting screw portion connectable with the socket, and an actuating member fixed to the turnable member located between the facing ends of the shell and the socket for turning the turnable member so as to connect the projecting screw portion thereof with the socket. The various components of the fitting are preferably formed from plastic material so that these components may be manufactured, especially by injection molding, at very reasonable costs.

The turnable member is preferably in the form of a shaft located in the aforementioned shell with the projecting portion provided with a screw thread projecting beyond the open end of the shell, whereas the actuating member is preferably in the form of a lever projecting in radial direction and substantially normal to the axis of the shaft between the shaft portion and the projecting threaded portion. This lever is integrally formed with the shaft portion and the projecting portion, and the other furniture part is formed with a slot-shaped cutout open towards an inner face of the other furniture part and arranged in such a manner that the aforementioned lever after turning of the shaft and the projecting threaded portion thereon for engagement with a corresponding inner thread provided in the socket, will be located substantially in the aforementioned cutout so that after assembly of the two furniture parts only the lever in the aforementioned cutout will be visible and so that no separate cover on the outside of the two furniture parts will be necessary. The threads on the projecting portion of the turnable member and the corresponding thread in the socket are preferably formed with a large pitch so that a threaded connection between the projecting portion and the socket may be assured by turning the turnable member through an angle of less than 180°. Preferably, the thread on the projecting portion and the socket are constructed as a multiple thread, preferably as a tripple thread.

The manufacture of the fitting may be simplified by forming the shell which has to be introduced in a bore of one of the furniture parts as a hollow cylinder closed at one end and provided at the other end thereof with an inwardly directed annular portion adapted to snap into an annular groove formed in the shaft portion of the turnable member. The shell is provided for this purpose with at least one axially extending slot so that the shaft may be introduced into the shell past the inwardly projecting annular portion thereof before the shell is fitted in the bore of one of the furniture parts. After the shaft is introduced into the shell and the inwardly projecting annular portion on the shell has snapped into the groove of the shaft portion, the shell is introduced into the bore of one of the furniture parts and the shaft portion of the turnable member is now axially fixed with respect to the shell since the slotted wall of the shell cannot spread any longer and the inwardly extending radial portion of the shell fixes the shaft against movement in axial direction. The closed end of the shell prevents penetration of glue in the interior thereof if the shell is glued in the bore of the one furniture part so that the turnable member will remain freely turnable within the shell. Likewise, glue is also prevented from penetration into the interior of the socket during glueing of the socket in a corresponding bore of one of the furniture parts so that the inner thread in the socket will remain free of glue.

According to a further feature of the present invention, cooperating locking means are provided on the socket and the turnable member to prevent an accidental release of the connection provided by the fitting. Preferably, the locking means comprise a plurality of grooves formed in the socket and a projecting portion adapted to engage in one of the grooves provided on the turnable member. The grooves are preferably formed on the free endface of the socket and extending in radial direction, and the projecting portion is preferably provided on the face of the actuating lever which is directed toward the endface of the socket in which the grooves are formed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a side view of the shell of the fitting drawn to an enlarged scale;

FIG. 5 is an axial cross-section through the shell;

FIG. 6 is an end view of the shell as viewed in the direction of the arrow VI of FIG. 5;

FIG. 7 is a side view of the turnable member to be assembled with the shell of FIG. 4 drawn to the same scale as FIG. 4;

FIG. 8 is a view of the component shown in FIG. 7 viewed in the direction of the arrow VIII of FIG. 7;

FIG. 9 is an end view of the component of FIG. 7 as viewed in the direction of the arrow IX of FIG. 7;

FIG. 13 is a side view of a modification of the threaded projecting portion of the turnable member.

DESCRIPTION OF THE PREFERRED EMBODIMENTS

Figure 1:
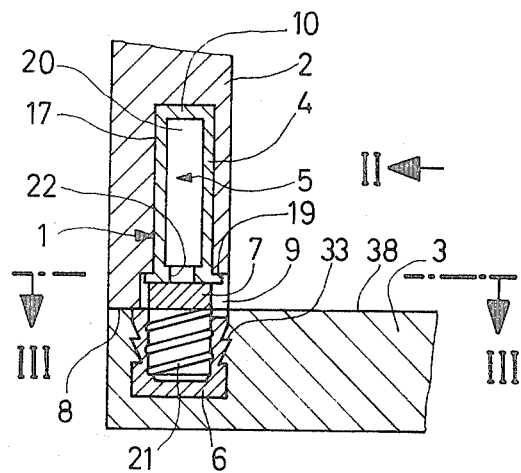
FIG. 1 is a cross-section taken along the line I—I of FIG. 3 through the fitting according to the present invention and two furniture parts connected by the fitting.
Figure 2:
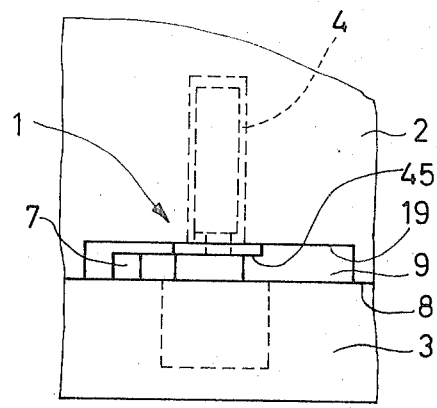
FIG. 2 is a view in the direction of the arrow II of FIG. 1.
Figure 3:
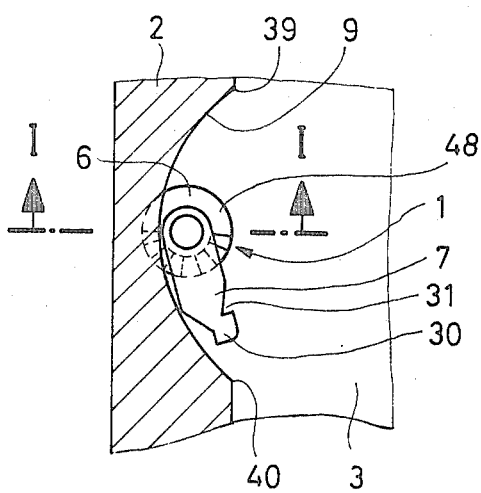
FIG. 3 is a cross-section taken along the line III—III of FIG. 1.

Referring now to the drawing and especially to FIGS. 1-3 of the same, it will be seen that the fitting 1 for releasably connecting two furniture parts 2 and 3 to each other comprises a shell 4 fixed in a bore of the furniture part 2, a member 5 turnably but axially immovably arranged in the shell and a socket 6 fixed in a bore of the furniture part 3. The shell 4 and the socket 6 are fixed in the corresponding bores of the furniture parts 2 and 3 by being for instance glued in the same. The furniture part 2 is provided in the region of its bore 17 therein in which the shell 4 is located, with a cutout 9 in form of a sector-shaped slot which is open towards the endface 8 of the furniture part 2, as best visible in FIGS. 2 and 3 of the drawing. An actuating member in form of a lever 7 which is fixedly connected by being for instance integrally formed with the member 5 is movable in the cutout 9. The member 5 may be turned by means of the lever 7 so that the thread 21 on the projecting portion of the member 5 may be threadingly engaged with a corresponding thread provided in the socket 6. The cooperating threads on the projecting portion of the member 5 and the socket are constructed, as will be explained later on in detail, so that a turning of the lever 7 through an angle of less than 180° will be sufficient to properly engage the two threads fully with each other.

The shell 4 is formed as a hollow cylinder having a closed end 10 and being provided at its other end 11 with an inwardly projecting annular portion 12 having an inner diameter 13 smaller than the inner diameter 14 of the remainder of the shell. The shell is further provided with slots 16 extending parallel to the longitudinal axis 15 of the shell from its end 11 substantially over two-thirds of the length of the shell. Due to the slots 16 provided in the shell, the wall portion thereof to opposite sides of the slots may be resiliently bent in outward direction so that the member 5 which has an outer diameter substantially corresponding to the interior diameter 14 of the shell may be passed through the inwardly projecting annular portion 12 with the smaller inner diameter 13, whereafter the inwardly projecting portion 12 will snap in a groove 22 formed in the member 5 so as to axially fix the latter to the shell 4. The shell is provided on its outer surface thereof with projections 47 in order to better secure the shell in the bore 17 of the furniture part 2 during glueing of the shell into the bore. The closed end 10 of the shell has a frustoconical configuration 18 so that the shell may be easily introduced into the bore 17, and this closed end will also prevent penetration of glue into the interior of the shell during introduction of the latter into the bore. An annular outwardly projecting flange 45 is provdied at the open end 11 of the shell, which flange engages, when the shell 4 is assembled in the bore 17 of the furniture part 2, the upper face 19 of the aforementioned cutout 9. The lever 7 engages with its upper face 46 the annular flange 45 so that the lever will easily glide on the annular flange, both of which are formed from plastic material.

The member 5 comprises a cylindrical shaft portion 20 and a projecting portion 21 provided with an outer screw thread and an actuating member in form of a lever 7, whereby between the lever 7 and the shaft portion 20 an annular groove 22 is provided for engagement with the radially inwardly projecting portion 12 on the shell 4. The thread on the projecting portion 21 is formed with a large pitch and is preferably constructed as a tripple thread. A projection 42 extends downwardly from the bottom face 41 of the lever 7 and radially with respect to the longitudinal axis 29 of the member 5 and substantially in the middle of the lever 7. The sidefaces of the projection 42 taper toward the endface 27 of the projecting portion 21, and the free end of the projecting portion is surrounded as shown in FIG. 8. The lever 7 which is integrally formed with the member 5 extends substantially normal to the axis 29 and is provided in the region of its free end 30 on the one side thereof with a notch 31 and on the other side thereof with a slanted face 44 for possible engagement with a screwdriver or a similar tool. The threads on the projecting portion 21 start at a certain small distance from the free endface 27 thereof. The shaft 20 is preferably provided at the free end 28 thereof with a frustoconical portion to facilitate insertion of the shaft into the interior of the shell 4. The outer diameter of the shaft corresponds essentially to the inner diameter 14 of the shell 4 and the diameter of the bottom of the groove 22 corresponds essentially to the diameter 13 of the inwardly projecting annular portion 12 of the shell 4. During axial introduction of the shaft 20 into the shell 4, the wall portions of the shell 4 are spread due to the slots 16 formed therein until the inwardly projecting portion 12 of the shell snaps, due to the elasticity of the latter, into the groove 22 provided in the shaft portion. After introduction of the shaft portion 20 into the shell 4, the latter is glued into the bore 17 of the furniture part 2 so that the wall portions of the shell 4 may not spread any longer outwardly and the member 5 is turnably but axially immovably secured in the shell.

Figure 10:
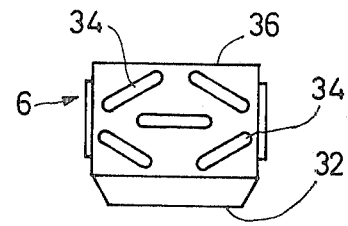
FIG. 10 is a side view of the sockets of the fitting drawn to the same scale as FIG. 4.
Figure 11:
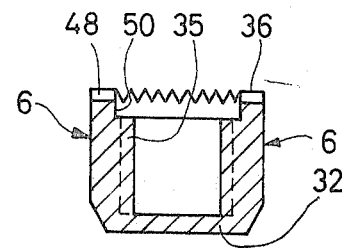
FIG. 11 is an axial cross-section through said socket.
Figure 12:
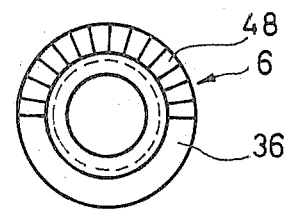
FIG. 12 is a top view of the socket.

The socket 6 has a bottom 32 which prevents penetration of glue, during glueing the socket in the corresponding bore of the furniture part 3, into the interior of the socket. In the embodiment shown in FIG. 1, the socket 6 is provided with circumferential ribs 33 on the outer surface thereof which penetrate into the material of the part 3 which is usually made of wood. In the embodiment shown in FIG. 10, the socket 6 is provided at the outer surface thereof with projections 34 distributed in an irregular member at the outer surface of the socket and which likewise will be pressed into the material of the part 3. The bore 35 of the socket 6 is provided with a female screw thread, which corresponding to the screw threads on the projecting portion 21 of the turnable member 5 and is likewise constructed as a tripple thread. A plurality of grooves 48 extending radially to the longitudinal axis of the socket 6 are provided in the endface 36 thereof. The grooves 48 are of triangular cross section and are provided substantially only on half of the endface 36. The socket is provided at its open end thereof with a counterbore 50 facilitating insertion of the projecting portion 21 of the member 5 into the socket.

Before connecting the parts 2 and 3 to each other, the free end 30 of the lever 7 is placed against the end 39 (FIG. 3) of the cutout 9 and the projecting portion 21 of the member 5 is placed in the counterbore 50 of the socket 6 which is mounted in the furniture part 3 in such a manner that the grooves 48 are located slightly beneath the surface 38 of the part 3. By applying a light blow onto the furniture part 2, the projecting portion 21 will thread automatically in the corresponding thread in the socket 6, whereby the lever 7 will move in clockwise direction. Thereby the projection 42 on the lever 7 will engage in a first one of the grooves 48. In order to finally assemble the parts 2 and 3, the lever 7 is turned by hand further in clockwise direction, whereby for instance a screwdriver may be used which is engaged in the notch 31. The projection 42 will thereby ratchet over additional grooves 48 until the two furniture parts 2 and 3 are firmly connected to each other. The construction is made in such a manner that in the final position of the furniture parts the lever 7 will be with its end adjacent the end 40 of the cutout 9 as shown in FIG. 3, so that the lever 7 is practically located in its entirety in the cutout 9.

FIG. 13 illustrates a modification in which the projection 42 on the lever 7 cooperating with the grooves 48 on the socket 6 are omitted. The locking means constituted by the projecting portion 42 and the grooves 48 in the previously described embodiment are constituted in the embodiment illustrated in FIG. 13 by teeth 24 formed on the screw thread 23 of the three screw threads 23, 25 and 26 as shown in FIG. 13 which will dig slightly in a corresponding screw thread of the socket to thus prevent an undesirable disconnection of the members 2 and 3 after assembly of the latter in the aforementioned manner.

All parts of the above-described fitting are made from plastic material, preferably polyamide, but the socket 6 is preferably made from material which is softer than the material of the member 5 and the projecting threaded portion thereof. All parts may be formed by injection molding so that further machining of these parts will be unnecessary. The member 5 with its integrally formed lever 7 can be easily inserted, as described above, into the shell 4 and the latter as well as the socket 6 may in a simple manner be glued into corresponding bores in the furniture part at the plant in which the furniture parts are manufactured so that the user of the furniture may subsequently easily assemble the furniture parts in the above-described manner, respectively disassembling the same when desired and the danger of losing any of the parts of the fitting during shipment is evidently avoided. The assembly or disassembly of the furniture parts may be carried out in the shortest time and practically without any tools.

It will be understood that each of the elements described above, or two or more together, may also find a useful application in other types of fittings for releasably connecting two parts differing from the types described above.

While the invention has been illustrated and described as embodied in a fitting for releasably connecting two furniture parts with each other, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fitting for releasably connecting two parts, especially furniture parts, comprising, in combination, a socket fixed in a bore of one of said parts; a shell axially aligned with and facing with one end thereof a corresponding end of said socket and fixed in a bore of the other of said parts; a member turnably but axially immovably mounted in said shell and having an axially projecting threaded portion connectable with said socket; and an actuating member fixed to said turnable member located between the facing ends of said shell and said socket for turning said turnable member so as to connect that projecting threaded portion thereof to said socket.

2. A fitting as defined in claim 1, wherein said turnable member comprises a shaft portion in said shell and said projecting portion being provided with an outer screw thread, said actuating member being fixedly connected to said turnable member between said shaft portion and said projecting portion.

3. A fitting as defined in claim 2, wherein said actuating member is a lever integral with said turnable member.

4. A fitting as defined in claim 3, wherein said lever projects laterally from and substantially normal to the axis of said turnable member.

5. A fitting as defined in claim 4, wherein said lever is provided in the region of the free end thereof with engaging faces for engaging the lever with a tool such as a screwdriver.

6. A fitting as defined in claim 3, wherein said other part is provided with a cutout and wherein said lever is dimensioned to fit with a major portion thereof in said cutout.

7. A fitting as defined in claim 3, wherein said shaft portion is provided adjacent said lever with a portion of reduced diameter.

8. A fitting as defined in claim 2, wherein said outer screw thread on said projecting portion has a large pitch so that said projecting portion may be screwed into the socket during turning of said turnable member through an angle of less than 180°.

9. A fitting as defined in claim 8, wherein said outer screw thread is a multiple screw thread.

10. A fitting as defined in claim 7, wherein said shell is a cylindrical shell having opposite said one end a closed end and in the region of said one end a radially inwardly extending annular portion engaging in said portion of reduced diameter of said shaft portion of said turnable member.

11. A fitting as defined in claim 10, wherein said shell is provided with at least one slot extending from said one towards said closed end thereof.

12. A fitting as defined in claim 11, wherein said slot extends over about two-thirds of the length of said shell.

13. A fitting as defined in claim 1, wherein said shell is provided on the outer surface thereof with projections for securing said shell in the bore of said other part.

14. A fitting as defined in claim 1, wherein said socket is provided on the outer surface thereof with projections for securing the socket in the bore of said one part.

15. A fitting as defined in claim 9, wherein said socket is provided on the inner surface thereof with a multiple screw thread for engagement with a multiple screw thread on said projecting portion of said turnable member.

16. A fitting as defined in claim 1, and including cooperating locking means on said socket and one of said members for preventing accidental turning of said turnable member relative to said socket after engagement of said projecting portion of said turnable member in said socket.

17. A fitting as defined in claim 16, wherein said cooperating locking means comprise a plurality of grooves in said socket and a projection on said one member for engagement in one of said grooves.

18. A fitting as defined in claim 17, wherein said grooves are provided on an endface of said socket and wherein said projection is provided on said actuating member.

19. A fitting as defined in claim 18, wherein said grooves extend in radial direction of said socket.

20. A fitting as defined in claim 17, wherein said actuating member is a lever fixedly connected to said turnable member adjacent said projecting portion and wherein said projection projects from the connected end of said lever substantially radially with respect to said projecting portion of said turnable member.

21. A fitting as defined in claim 15, wherein at least one thread on said projecting portion is provided with a plurality of axially extending teeth for locking engagement with the screw thread in said socket.

22. A fitting as defined in claim 8, wherein the end of said screw thread is axially spaced from the free end of said projecting portion.

23. A fitting as defined in claim 1, wherein said shell, said turnable member and said socket are formed from plastic material and wherein said plastic material of said socket is softer than that of said turnable member.

24. A fitting as defined in claim 6, wherein said cutout in said other part is located with respect to said one part and said lever so that the latter may be turned substantially through 180° during engagement of said projecting portion in said socket.

* * * * *